March 27, 1962  F. E. GRAVES  3,027,042
PLASTIC THREADED PLUGS
Filed Sept. 8, 1960
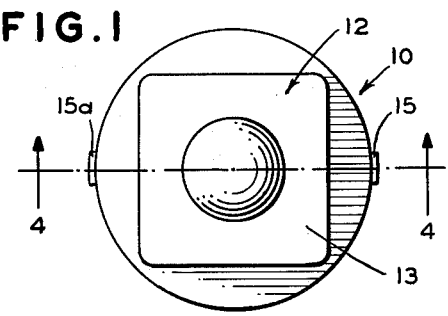
FIG.1
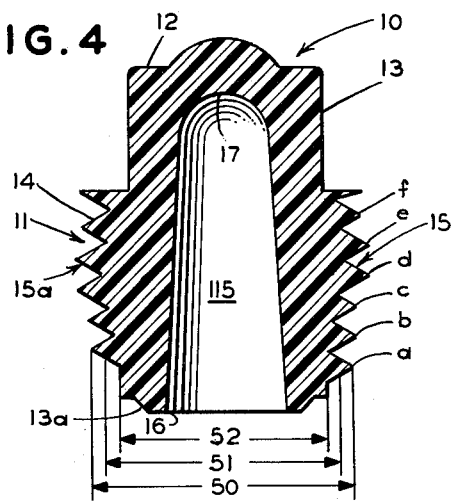
FIG.4
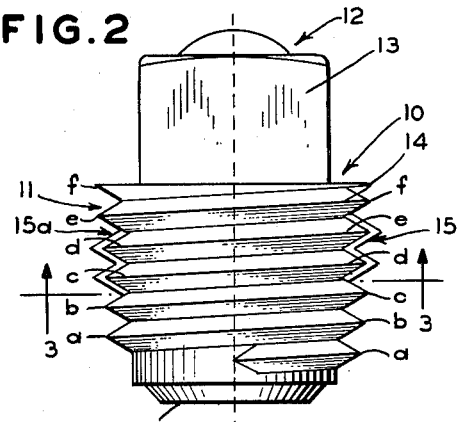
FIG.2
FIG.3
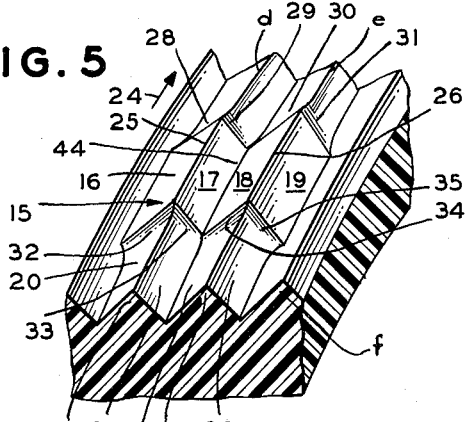
FIG.5
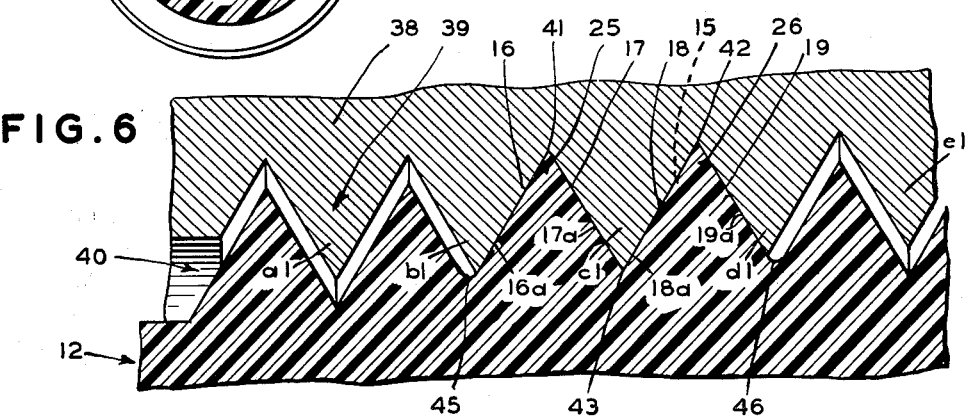
FIG.6

United States Patent Office 3,027,042
Patented Mar. 27, 1962

3,027,042
PLASTIC THREADED PLUGS

Frederick E. Graves, Westport, Conn., assignor to Russell, Burdsall & Ward Bolt and Nut Company, Port Chester, N.Y., a corporation of New York
Filed Sept. 8, 1960, Ser. No. 54,676
6 Claims. (Cl. 220—39)

This invention relates to threaded plugs made of plastic, and more particularly to molded threaded plastic plugs of the type having male threads which are designed to be screwed into a female part having a threaded bore having female threads complementary to the male threads of the threaded plastic plug.

Threaded plugs made of plastic are already well known. Such plugs may be made of nylon or of other moldable thermoplastic material and they are frequently made hollow. That is, they have male pipe threads molded on the exterior surface to mate with female threads in a threaded bore and they are frequently made to have a blind bore longitudinally of the plug. When such a threaded plastic plug is made to serve, for example, as a pipe plug, the plastic plug, when screwed into a female pipe fitting, will serve very well to maintain a high fluid pressure within the pipe without leakage. However, it seems paradoxical that such a plug will hold high fluid pressure within a pipe without leakage but will permit leakage at low pressure. The reason for this appears to be that a high internal fluid pressure exerting itself within the hollow or blind bore of the plug exerts forces radially against the wall of the plug, which are sufficient to force the surfaces of the male threads into close and tight frictional engagement with the roots of the complementary female threads in the pipe fitting. The result is a sealing of the helix path of the threads around the plug. At internal pressures which are not high enough to force the cylindrical wall of the plug radially outward, the helix path or space along the threads is not sealed off and fluid will leak along the unsealed helix passageway between the male threads of the plug and the female threads of the pipe fitting. Hence, the seeming paradox that a threaded plastic pipe plug seals at high pressure and leaks at low pressure.

According to my invention I proved a threaded plastic plug which will not only not leak at high pressure but as well, will not leak at low pressure. To accomplish this desirable objective I provide bosses, molded integrally with the molded threaded body of the plug and of the same plastic material, the bosses being preferably, but not necessarily, 180° apart and extending outwardly from the normal surfaces of the molded threads and positioned preferably, but not necessarily, approximately midway of the coaxial length of the threaded portion of the plug. The bosses are integrally formed with the plastic body of the plug and may be extended outwardly from the root of the helical thread on the exterior surface of the plug; or the bosses may extend inwardly or outwardly from the crest of the thread, or the bosses may be formed in both ways on the external surface of the threaded part of the plug.

These bosses molded integrally with the plug body and of the same plastic material are deformed by the mating threads of the female part, or pipe coupling, when the plug is screwed into it, and cause the plastic material to be compressed and extruded, in part, into the space between the threads of the female part, (which is usually of metal) and the threads of the male plastic plug, so that the helical pathway between the threads of the plug and the female part is effectively sealed, as by a gasket, when the plug is screwed home with the result that the plug will not leak either at low or at high pressure. This sealing engagement is accomplished without requiring undue or excessive turning torque to screw the plug home.

Although the novel features which are believed to be characteristic of the invention are pointed out in the annexed claims, the invention itself as to its objects and advantages, and the manner in which it may be carried out may be better understood by reference to the following description taken in connection with the accompanying drawings forming a part hereof, in which FIG. 1 is an end view of a threaded plastic pipe plug embodying my invention;

FIG. 2 is a view in elevation of the threaded plug shown in FIG. 1;

FIG. 3 is a view in section on line 3—3 of FIG. 2;

FIG. 4 is a view in section on line 4—4 of FIG. 1;

FIG. 5 is a broken-away view in perspective to greatly enlarged scale showing a typical boss molded integral with the male threads; and FIG. 6 is partial view in section also enlarged and somewhat exaggerated for clarity to illustrate the compression, extrusion, deformation and sealing effect brought about by the plastic bosses which are integrally molded on the male thread of the plug, when the bosses are engaged by the female thread of the female mating part when the plug is screwed home.

Referring now to the drawings in which like reference characters indicate like parts throughout the several views and directing attention particularly to the embodiment illustrated in FIGS. 1 to 6 inclusive, there is shown a threaded plastic pipe plug 10, the scale being somewhat enlarged for clarity. The plug is preferably made of a thermoplastic such as acetal resin. Such plastics in a variety of compositions are available from which can be selected a thermoplastic having the desired degree of dimensional stability, tensile and flexural strength, resilience, abrasion resistance and desirable frictional properties for pipe plugs or for threaded plugs of a similar nature. Acetal resins offered for sale under the brand name Delrin by E. I. du Pont de Nemours & Co. of Wilmington, Delaware and other known thermoplastics used for machine parts, such as bearings, cams, gears and the like may be used for producing threaded plastic plugs according to my invention.

The plug 10, as shown, comprises a hollow threaded body shank portion 11 and a head portion 12 in the form of a squared head 13 to accommodate a suitable tool, such as a wrench, for turning the plug to screw it into or unscrew it out of a mating threaded bore. It will be understood that the head may be of larger size and different shape, if desired.

The male thread 14 around the periphery of the generally cylindrically shaped body shank portion may be of any desired design or standard. As shown, the male thread 14 on the plug is a standard pipe thread and is, of course, such as to mate with a standard female pipe fitting. The helix thread has the desired number of turns 14 (a, b, c, d, e, and f).

The threaded plastic plug 10 has an internal blind bore 115 open at the inner end 16 and closed by the outer end wall 17 of the plug. In some instances the bore 115 may, if desired, be dispensed with and the plug made solid throughout In accordance with my invention I provide molded-in bosses in the helical path of the male thread 14 of the plug, preferably 180° apart and at a distance from the inner end 13a sufficient to permit easy starting of the plug into its complementary female threaded bore and preferably a distance from the starting end 13a of at least two turns of the male thread. If more than two bosses are used it is desirable that they be spaced circumferentially equal distances apart. The bosses, which, for convenience of description, are herein referred to as "boss-gaskets" are molded integral with the material of the body of the plug. As shown in the drawings there are two similar boss-gaskets 15 and 15a, circumferentially spaced 180° apart. They are molded integrally by providing appropriate intaglio cavities in the forming molds in which the thermoplastic is molded under heat and pressure to produce the threaded plug. It will be understood that a number of boss-gaskets other than two may be molded on the screw thread 14. It may be observed here that for convenience of nomenclature the entire thread 14 is referred to as the thread whreas the individual turns are referred to as turns a, b, c, d, e, f, of the thread.

Inasmuch as the boss-gaskets are similar it will suffice to describe one, as typical. A typical boss-gasket 15 comprises a projection extending outwardly from the normal surfaces of two adjacent turns of the thread (in a radial direction) from the center. As shown, the projection or boss-gasket 15 extends outwardly from the crests of two turns of the helical thread 14, namely from the crests of turns d and e. The outer surface faces of the boss-gasket, comprising in general faces 16, 17, 18, 19 are raised above the normal surfaces respectively of the sides 20, 21, 22, 23 of the turns d and e of the thread 14 (see FIG. 5). The thickness of the boss, that is, the distance from the normal surface 23, to the surface 19, for example, is sufficient to frictionally engage the complementary surfaces of the sides and roots of the female metal thread when the plug is screwed home. Taking as an example, a three-eighths inch pipe plug, the thickness of the boss-gasket or its distance above the normal surfaces of the two-thread turns d and e, is .007" (seven-thousandths of an inch). This has been found to be satisfactory, but this thickness for the boss-gasket above the normal surfaces of the thread may be from .005" to .010", the important consideration being to provide sufficient mass or body of plastic in the boss to make certain that the surfaces 16, 17, 18, 19 and especially the crests 25, 26 of the boss frictionally engage the complementary surfaces of the female threads, including their roots, of the bore into which the plug is screwed. The circumferential or arcuate length of the crests 25 and 26, as shown, is 13° and this length may vary from 10° to 15°. It should be long enough to provide effective sealing but not too long to unduly increase the turning torque required to screw the plug home.

The leading edges 28, 29, 30, 31 and the trailing edges 32, 33, 34, 35 of the raised portions 16, 17, 18, 19, of the boss-gasket 15 (see FIG. 5) are inclined downwardly toward their corresponding faces 20, 21, 22, 23 of the turns d and e of thread 14. That is, these edge surfaces 28 to 35, inclusive, are "feathered out" to provide easier starting and turning of the plug when screwing it into a female threaded bore. The shape of the boss-gasket provides, in effect, a cam shape so that as the plug is screwed (in the direction of arrow 24) into its female bore, the crests 25, 26 and surfaces 16, 17, 18, 19 form effective seals in the helical path of the corresponding, complementary female thread. It will now be seen that the surfaces 16, 17, 18, 19 extend outwardly a distance beyond the major diameter 50 of the thread 14. The pitch diameter 51 and the root diameter 52 are indicated in FIG. 4.

In FIG. 6 are illustrated to somewhat larger scale the action and position of the boss-gasket after the plug is screwed home in a female threaded bore. The female threaded bore is represented as in a pipe which may be a threaded steel or metal coupling 38 having a female thread 39 having turns a1, b1, c1, d1. After the plug 12 is screwed home into the female bore 40 it will be noted that the crests 25, 26 of the boss-gasket 15 frictionally engage the corresponding roots 41, 42 of the female thread. In fact, the thermoplastic material of the boss-gasket is actually crowded so that the surfaces 16, 17, 18, 19 are squeezed against the corresponding metal side wall surfaces 16a, 17a, 18a, 19a, of the corresponding female thread 39. It will be observed also that the crest 43 of the female thread crowds into the root 44 of the boss-gasket and also the thermoplastic material at the edges 45, 46 of the boss-gasket become extruded into the helical path of the female thread. Hence, an effective seal is provided to prevent leakage along the helical path of the female thread. It will be understood, of course, that the illustration, as shown, in FIG. 6, indicating a helical space along the female thread, is perhaps somewhat exaggerated but this has been done better to illustrate the sealing action of the boss-gasket.

Inasmuch as boss-gasket 15 has been described in detail, it is deemed unnecessary to described in detail boss-gasket 15a, which is positioned 180° from boss-gasket 15, since it is similar and operates and serves in the same manner as boss-gasket 15.

The terms and expressions which have been employed herein are used as terms of description and not of limitation, and there is no intention in the use of such terms and expressions, of excluding any equivalents of the features shown and described or portions thereof, but it is recognized that various modifications are possible within the scope of the invention claimed.

What is claimed is:

1. A male one-piece molded plastic threaded plug comprising a head portion and a threaded body portion of generally cylindrical shape having a male helical thread molded on the exterior cylindrical surface thereof, at least one boss molded in the threaded portion of said shank extending outwardly from the normal surfaces of said thread, said boss being of the same plastic material as the body of said plug and extending outwardly beyond the major diameter of said helical thread, the material in said boss being compressed, deformed and extruded within the helical pathway between the plastic thread of the plug and the mating female thread of a threaded bore into which the plug is secured when said plug is screwed home in said bore, said deformed plastic boss forming a sealing and frictional locking gasket in said helical pathway between said threaded male plug and female threaded bore.

2. A male one-piece molded plastic threaded plug adapted for screwing into a bore of a mating metal part having a metal female thread complementary to the male thread on said plug, said plastic plug comprising a head portion adapted to accommodate a turning tool and a threaded body shank portion of generally cylindrical shape having a male helical thread molded on the exterior cylindrical surface thereof, a gasket-boss molded in the threaded portion of said shank, said gasket-boss extending outwardly from the root of said thread and located at a coaxial distance from the inner end of said plug by at least two turns of said thread, said boss-gasket being of the same plastic material as the body of said plug and extending outwardly beyond the major diameter of said helical thread, the material of said gasket-boss being compressed, deformed and extruded within the helical pathway between the plastic thread of the plug and the mating female metal thread of the threaded bore of said female mating part into which the plug is screwed, a sealing and frictional locking gasket in said helical pathway between said threaded plastic plug and female threaded bore when said plug is screwed home.

3. A molded plastic plug constructed according to claim 2 having a second boss-gasket similar to the other bass-gasket molded in said male thread and circumferentially spaced from said other boss-gasket.

4. A molded plastic plug constructed according to claim 3 in which said boss-gaskets are spaced 180° apart.

5. A molded plastic plug constructed according to claim 4 in which said bosses have an exposed surface lying in a circle having a diameter greater than the major diameter of said male thread and a width having a coaxial length corresponding to the distance between the roots of at least two turns of said male thread.

6. A male one-piece molded plastic threaded plug comprising a head portion and a threaded body portion of generally cylindrical shape having male thread on the exterior cylindrical surface thereof, at least one boss molded in the threaded portion of said shank extending outwardly from the normal surfaces of said thread and located at a coaxial distance from the inner end of said plug by at least two turns of said thread, said boss being of the same plastic material as the body of said plug, said boss having an exposed outer surface portion lying in a circle having a greater diameter than the major diameter of said male thread and said boss having a coaxial length corresponding to the distance between the roots of at least two turns of said male thread, the material in said boss being compressed, deformed and extruded within the helical pathway between the plastic thread of the plug and the mating female thread of a threaded bore into which the plug is secured when said plug is screwed home in said bore, thereby forming a sealing and frictional locking gasket in said helical pathway between said threaded male plug and female threaded bore.

References Cited in the file of this patent

UNITED STATES PATENTS

| | | |
|---|---|---|
| 2,349,593 | Hosking | May 23, 1944 |
| 2,585,621 | Brandon | Feb. 12, 1952 |

FOREIGN PATENTS

| | | |
|---|---|---|
| 1,100,337 | France | Apr. 6, 1955 |